United States Patent [19]

Sasamoto et al.

[11] Patent Number: 5,132,584

[45] Date of Patent: Jul. 21, 1992

[54] VEHICULAR AC GENERATOR WITH VIBRATION DAMPER SYSTEM

[75] Inventors: Takahiro Sasamoto; Hitoshi Okamoto, both of Nagasaki, Japan

[73] Assignee: Mitsubishi Denki Kabushiki Kaisha, Japan

[21] Appl. No.: 431,925

[22] Filed: Nov. 6, 1989

[30] Foreign Application Priority Data

Nov. 7, 1988 [JP] Japan ............................. 63-145096[U]

[51] Int. Cl.$^5$ ...................... H02K 11/00; H02K 5/24
[52] U.S. Cl. .................... 310/68 D; 310/71; 310/51
[58] Field of Search ............ 363/126, 144, 145; 310/51, 680, 91, 112, 71, 113, 114, 165

[56] References Cited

U.S. PATENT DOCUMENTS

| | | | |
|---|---|---|---|
| 3,895,247 | 7/1975 | Iwata et al. | 310/68 D |
| 4,015,184 | 3/1977 | Cooperman | 321/8 C |
| 4,103,193 | 7/1978 | Ito | 310/68 D |
| 4,189,653 | 2/1980 | Hiratuka et al. | 310/68 D |
| 4,305,088 | 12/1981 | Nirita et al. | 357/79 |
| 4,321,664 | 3/1982 | Matthai | 363/145 |
| 4,424,560 | 1/1984 | Kaspeski | 363/144 |
| 4,488,072 | 12/1984 | Archibald et al. | 310/91 |
| 4,631,656 | 12/1986 | Olsson | 363/144 |

FOREIGN PATENT DOCUMENTS

| | | | |
|---|---|---|---|
| 3409333 | 9/1985 | Fed. Rep. of Germany | 310/68 D |
| 1363715 | 3/1964 | France | 310/68 D |
| 60-109748 | 6/1985 | Japan . | |

OTHER PUBLICATIONS

"AC/DC Transmission Type Diesel Electric Locomotives for New Zealand National Railways" Mitsubishi Denki Giho, vol. 42, Nov. 5, 1968.
"Electrical Equipment of 2,200 HP Diesel Electric Locomotive for N.S.W. Government Railways" Mitsubishi Denki Giho, vol. 47, No. 7, 1973.
Electro-Motive's Traction Generators, General Electric, Mar. 1973.

Primary Examiner—Steven L. Stephan
Assistant Examiner—C. LaBalle
Attorney, Agent, or Firm—Leydig, Voit & Mayer

[57] ABSTRACT

A vibration damping system, for supporting a substantially vertically extending member having a bottom to be supported relative to a foundation, comprising a first and a plurality of second vibration damper members. The first damper member is mounted between the bottom of the member to be supported and the foundation and having a predetermined spring characteristic and a predetermined damping characteristic. The second vibration damper members are mounted between an upper portion of the member to be supported and the foundation and extending substantially horizontally to the foundation and at a predetermined angle relative to each other, the second vibration damper members having a predetermined spring characteristic and a predetermined damping characteristic. A vehicular a.c. generator and a dynamoelectric machine utilizing such the vibration damping system are also disclosed.

13 Claims, 10 Drawing Sheets

VEHICULAR AC GENERATOR WITH VIBRATION DAMPER SYSTEM

BACKGROUND OF THE INVENTION

This invention relates to a vibration damper system and more particularly to a dynamoelectric machine such as a vehicular a.c. generator equipped with a vibration damper system, which includes an a.c. generator of the type driven by a Diesel engine on an electric rolling stock to provide electric power to an a.c. motor or an inverter-controlled induction motor mounted on the electric rolling stock.

In a conventional a.c. generator in which an electric power generated by a small-capacity vehicular a.c. generator driven by an internal combustion engine mounted on the vehicle is full-wave rectified by a rectifier unit to drive a d.c. motor and the like, the rectifier unit is mounted within a small space defined by the generator frame. One example of such a small capacity vehicular a.c. generator for an automobile is disclosed in Japanese Patent Laid-Open No. 60-109748.

A conventional large-capacity a.c. generator for mounting on Diesel electric locomotive is disclosed in "MITSUBISHI TECHNICAL REPORT" Vol. 47, No. 7, pp. 763-767, in which the generator frame is contibevered from the engine frame and has a bearing on only one side and in which the generator is mounted on the side of the generator frame opposite to the engine. Therefore, severe design restrictions are imposed upon the frame rigidity, space within the frame and the like.

While a generator for mounting on a locomotive is required to increase its output power as the rail load transportation capacity is increased, the train speed is increased and the power demand such as for air conditioning in the train is increased, the generator of this kind must be as compact as possible because of the dimensional limitation imposed upon the locomotive, so that the rectifier unit is preferably self-contained even in a large-capacity generator.

However, since the rectifier unit is large for a large-capacity machine of 2000KVA or more and it is difficult to provide a space for the rectifier unit within the generator and to protect the semiconductor rectifier unit, which is more sensitive to the heat and vibration than the generator itself, from heat and vibration of the vehicle and the Diesel engine, the rectifier unit is mounted on the vehicle floor or on the outer surface of the generator frame. There is no example known to the applicant in which the rectifier unit is installed within the generator frame.

SUMMARY OF THE INVENTION

Accordingly, one object of the present invention is to provide a vibration damping system particularly suitable for supporting a rectifier unit of a vehicular generator.

Another object of the present invention is to provide a dynamoelectric machine in which the rectifier unit is installed within the machine frame.

Still another object of the present invention is to provide a vehicular a.c. generator free from the above-discussed disadvantages of the conventional vehicular a.c. generator.

A further object of the present invention is to provide a vehicular a.c. generator which is compact in size and yet durable.

Another object of the present invention is to provide a vehicular a.c. generator in which the rectifier unit is installed inside of the generator frame and yet protected against heat and vibration.

With the above objects in view, according to the present invention, a vehicular a.c. generator connectable to a driving engine and mounted on the vehicle comprises a generator frame, a stationary core mounted within a frame and having a generator armature winding wound thereon, a rotor core disposed within the stationary core with an air gap therebetween and having a generator field winding wound thereon, and a shaft having the rotor core secured thereon and connectable at the outside of the frame to the driving engine. The a.c. generator further comprises a bracket mounted to an end of the frame opposite to the driving engine, an exciter rotor core mounted on the shaft at the side opposite to the engine and having an exciter armature winding wound thereon for supplying an excitation current to the generator field winding through a rotating rectifier, and an exciter stator core disposed around the exciter rotor core with an air gap therebetween and mounted on the frame or the bracket and having an exciter field winding wound thereon. A recitifier unit for rectifying an a.c. current from the generator armature winding is disposed between the inner circumference of the frame opposite to the engine and the outer circumference of the exciter stationary core and a vibration damper system is disposed between the rectifier unit and the frame or the bracket.

The vehicular a.c. generator may further comprise a fan mounted to the shaft on an engine side end of the frame, an air intake window formed in at least one of a side plate on a non-engine side end of the frame and a non-engine side bracket, and an exciter stator mounted to one of the non-engine side end of the frame and a non-engine side bracket. A rectifier unit is substantially vertically mounted between the inner circumference of the non-engine side end of the frame and the outer circumference of the exciter stator, whereby the rectifier unit, the exciter and the generator are cooled by a cooling air flow induced by the fan through the air intake window.

The vibration damping system, for supporting a substantially vertically extending member having a bottom to be supported relative to a foundation, of the present invention comprises a first and a plurality of second damper members. The first vibration damper member is mounted between the bottom of the member to be supported and the foundation and has a predetermined spring characteristic and a predetermined damping characteristic, and the second vibration damper members are mounted between an upper portion of the member to be supported and the foundation and extend substantially horizontally to the foundation and at a predetermined angle relative to each other, the second vibration damper members having a predetermined spring characteristic and a predetermined damping characteristic.

The dynamoelectric machine of the present invention comprises a frame, a stationary core supported by the frame, an armature winding wound on the stationary core, a rectifier supported on the frame through a vibration damper member, a connection conductor connected between the armature winding and the rectifier, at least one portion of the connection conductor being formed by a flexible strip conductor, at least one portion of the flexible conductor being bent to accommodate any elongation, contraction or deformation of the connection conductor.

According to the vehicular a.c. generator of the present invention, the rectifier unit is installed within a space between the generator frame and the exciter stator core, so that the dimension of the generator can be limited within a reasonable range, and since the rectifier unit sensitive to vibrations is supported by the vibration damping system, the generator can be suitably mounted in a narrow space in a vehicle such as a locomotive and is durable against the vibrations of the vehicle and the engine.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
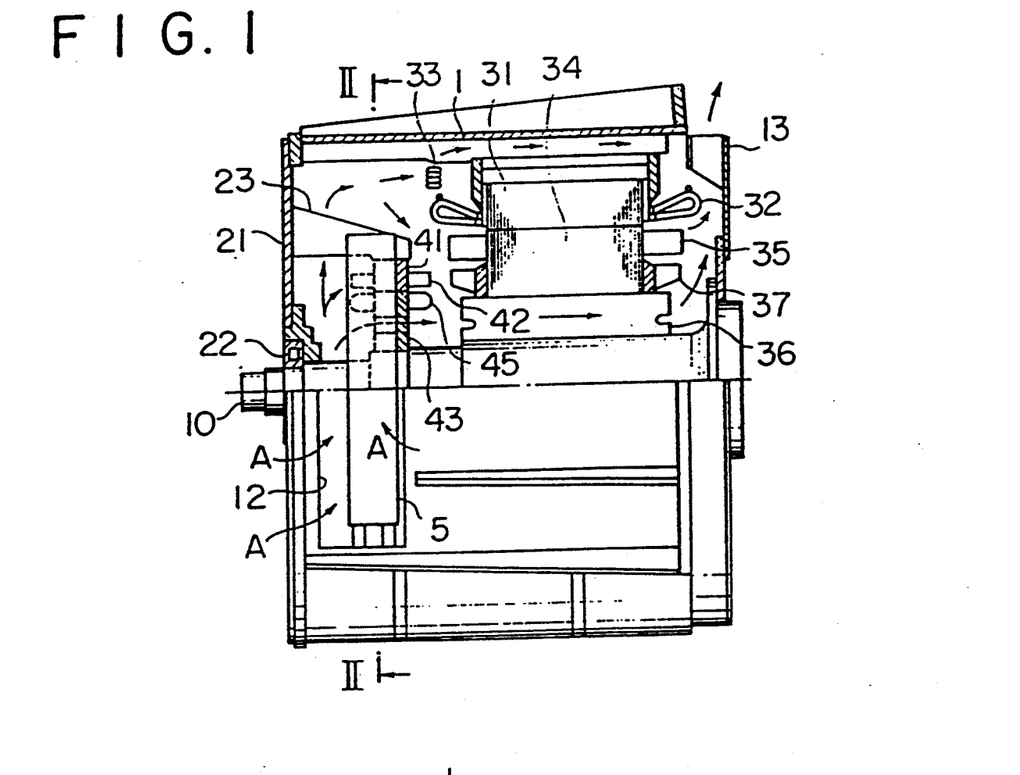
FIG. 1 is a side view showing one embodiment of a large-capacity vehicular a.c. generator of the present invention, the upper half being shown in section.
Figure 2:
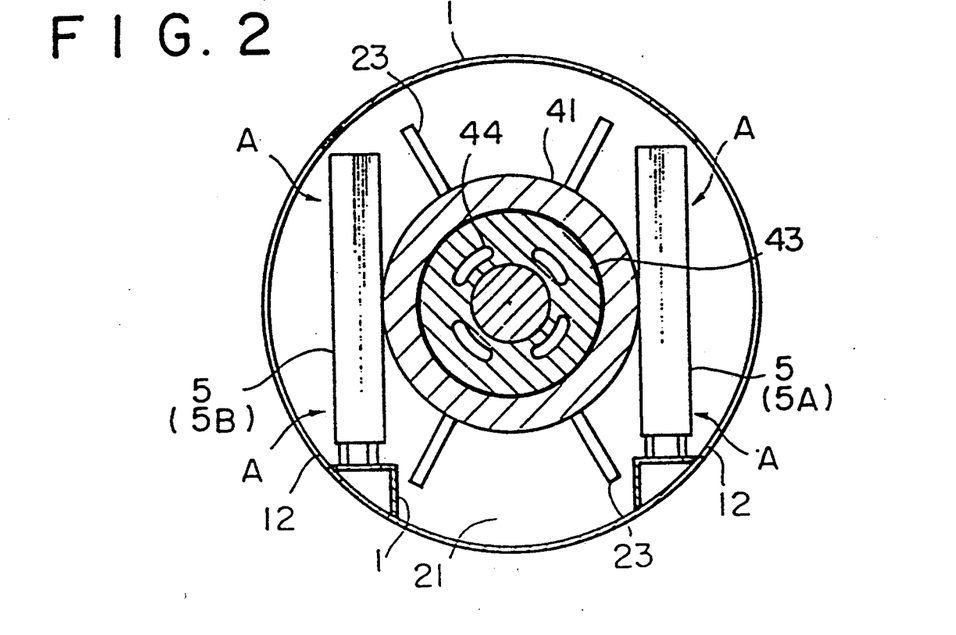
FIG. 2 is a sectional view taken along line II—II of FIG. 1.
Figure 10:
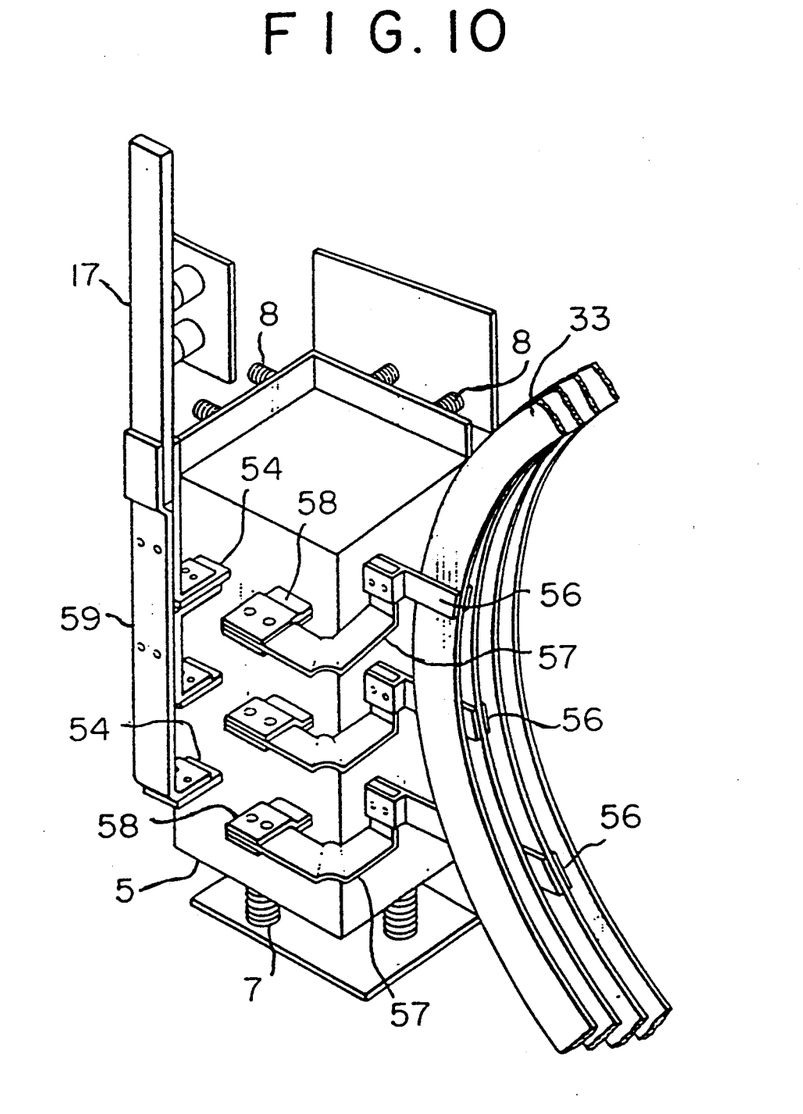
FIG. 10 is a perspective view illustrating the connecting arrangement for connecting the phase rings and the rectifier unit.

Referring now to FIGS. 1 to 4 and 12 of the drawings, in which one embodiment of the present invention is illustrated as being applied to a large-capacity brushless a.c. generator for mounting on a Diesel electric locomotive, the vehicular a.c. generator comprises a generator frame 1 which is provided with no mounting pedestals and therefore directly mounted to an engine frame 201 of a Diesel engine 2 in a contilevered state. The engine frame 201 is to be securely mounted to a floor (not shown) of the vehicle through mounting pedestals 202. Element number 31 is a stationary core secured to the inner circumference of the generator frame 1 so as to define a ventilation passage therein, 32 is an armature winding wound on the stationary core 31, 33 is a phase ring disposed on the side of the armature winding 32 opposite to the engine to which conductors for conducting output current generated by the winding 32 are attached as shown in FIG. 10. 34 is a rotor core disposed within the stationary core 31 with an annular gap therebetween, 35 is a generator field winding wound on the rotor core 34, 10 is a generator shaft connected to a shaft 205 of a Diesel engine 2 by a coupling 38, 13 is a main fan mounted to the engine-side end portion of the shaft 10, and 36 are plurality of ribs secured to the shaft 10 defining therebetween ventilating axial passages and supporting the rotary core 34 at their radially outer ends. 37 is an auxiliary fan mounted to the opposite ends of the rotor core 34, 21 is a bracket mounted on the side of the frame 1 remote from the engine, 22 is a bearing supporting the shaft 10 supported by the bracket 21 for supporting the shaft 10. It is to be noted that this bearing 22 is the sole bearing provided in the generator. 23 are a plurality of support arms projecting from the bracket 21, 12 is an air intake port formed in the generator frame 1 at the side opposite to the engine, 203 is an exhaust port formed in the engine frame 201 of the engine 2, 41 is an exciter stator core secured to the support arms 23, 42 is an exciter field winding wound on the exciter stator core 41, 43 is an exciter rotor core secured to the shaft 10 and disposed within the exciter stator core 41 with an air gap defined therebetween, 44 are axial ventilation holes formed in the rotor core 43, 45 is an exciter armature winding wound on the rotor core 43, 46 is a rotary rectifier (FIG. 3) connected (not shown) to the shaft 10, and 5 are rectifier units (FIGS. 3 and 4) for rectifying output current from the generator armature winding 32. The rectifier units 5 comprises a positive side rectifier element group 5A and a negative side rectifier element group 5B separated from each other as best shown in FIG. 2, each disposed in a space defined between the inner circumference of one end of the generator frame 1 remote from the engine 2 and the outer circumference of the exciter stator core 41.

Figure 3:
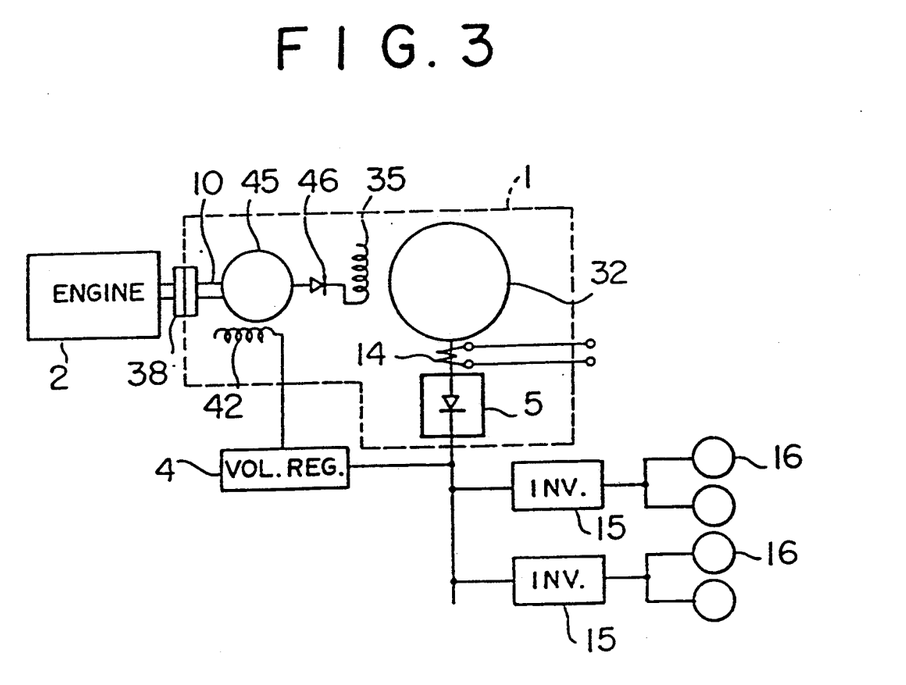
FIG. 3 is a circuit diagram illustrating the connection between the generator, the engine and the load.
Figure 4:
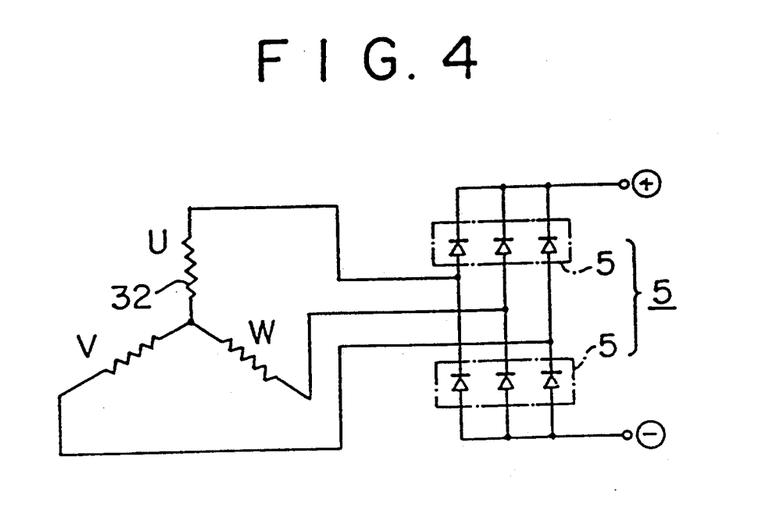
FIG. 4 is a connection diagram illustrating the armature winding and the rectifier unit of the generator.

Element number 4 is an automatic voltage regulator for controlling an output voltage from the generator, 14 is a current transformer connected to the output side of the generator armature winding 32, 15 are a plurality of inverters connected to the output side of the rectifier unit 5 for converting the output from the rectifier unit 5 into an a.c. voltage. 16 are a plurality of loads connected to the output side of the inverter 15 which may be a main electric motor for driving the locomotive and an induction motor for air conditioners and auxiliary power units. 204 is one of a pair of bearings of the engine 2, and the other bearing is omitted from illustration. The generator shaft 10 is supported by the bearings 22 and 204.

Figure 5:
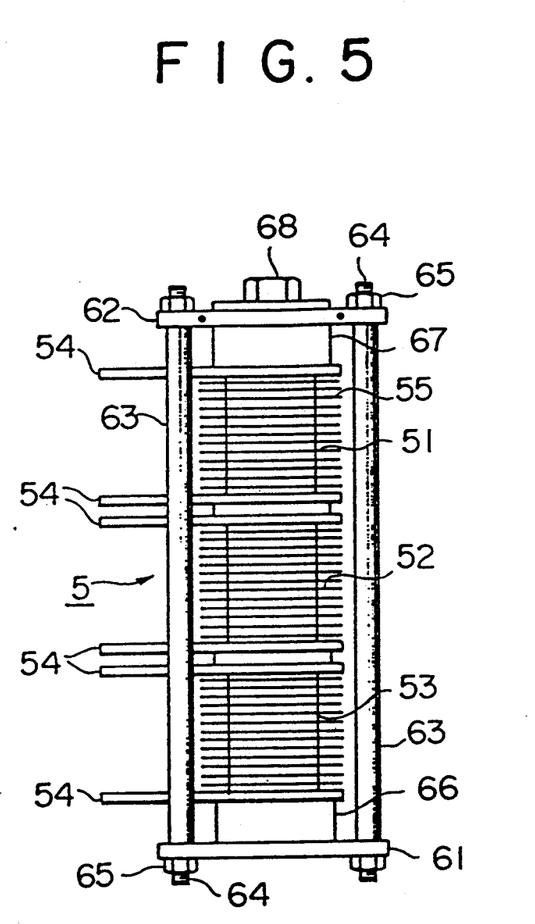
FIG. 5 is a front view of the rectifier unit.

The rectifier unit and the vibration damper system therefor will now be described in conjunction with FIGS. 5 to 7. In FIG. 5 which illustrates the rectifier unit, elements reference numerals 51 to 53 are semiconductor rectifier elements constituting the positive or negative side of each phase, 54 are terminals connected to the rectifier elements 51-53, 55 are cooling fins formed around the rectifier elements 51-53, and 5 is the rectifier unit. 61 and 62 are upper and lower plates fastened together by a plurality of fastener bolts 64 and nuts 65 for holding the rectifier elements 51-53, 68 is a bolt for properly tightening the rectifier elements 51-53 through spacers 66 and 67.

Figure 11:
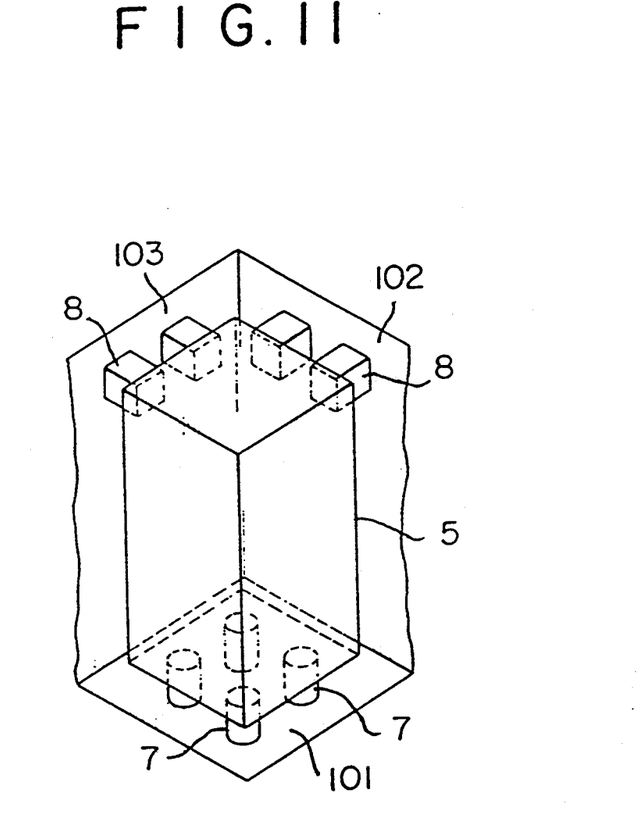
FIG. 11 is a perspective view schematically illustrating the vibration damping system for the rectifier unit.
Figure 12:
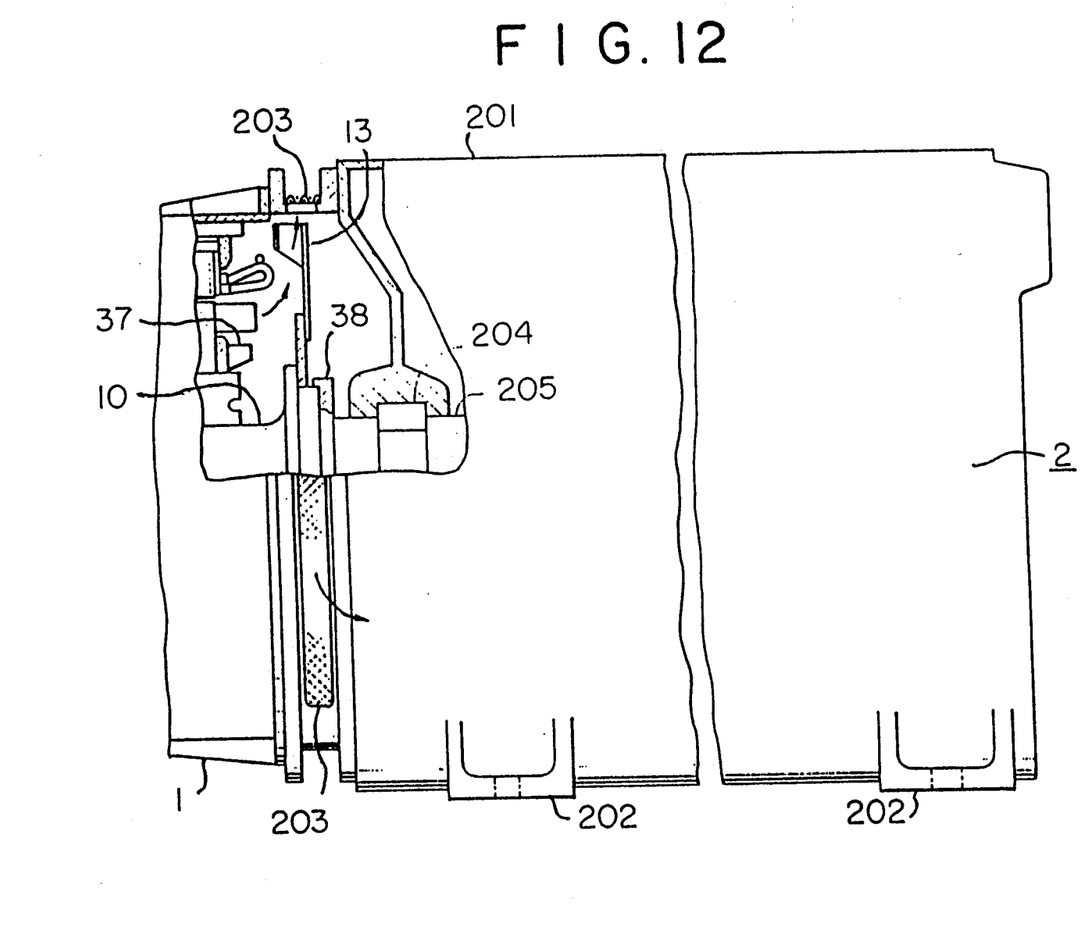
FIG. 12 is a partial sectional side view illustrating a manner in which the generator is connected to the Diesel engine.

A vibration damper system for supporting a vertically extending elongated member such as the above-described rectifier unit for the generator will now be described with reference to a schematic diagram of the vibration damping system of FIG. 11.

Figure 9:
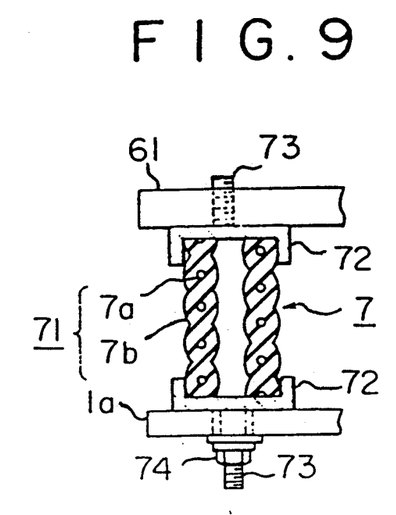
FIG. 9 is a sectional view of another vibration damper member.

This vibration damping system, for supporting a substantially vertically extending member such as the rectifier unit 5 having a bottom to be supported relative to a foundation 101, comprises a first vibration damper member 7 mounted between the bottom of the unit 5 and the foundation 101 and having a predetermined spring characteristic and a predetermined damping characteristic, and a plurality of second vibration damper members 8 mounted between an upper portion of the unit 5 to be supported and vertical wall portions 102 and 103 of the foundation 101 and extending substantially horizontally to the foundation floor 101 and at substantially right angles relative to each other. The second vibration damper members 8 have a predetermined spring characteristic and a predetermined damping characteristic. The first and the second vibrating damper members 7 and 8 each comprises a cylindrical damping element made of a hardened rubber having a predetermined elasticity and a predetermined damping characteristic and a coil spring embedded within said cylindrical damping element. One example of this structure is shown in FIG. 9.

Figure 8:
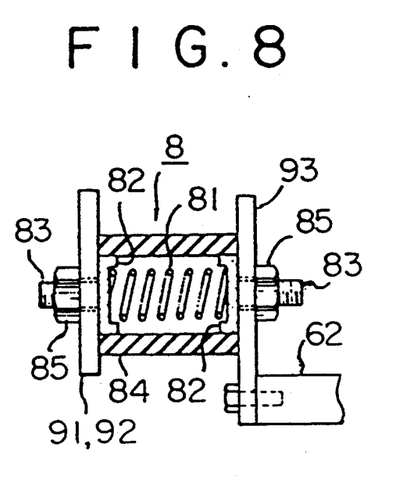
FIG. 8 is a sectional view of the vibration damper member.

The first and the second vibration damper members each comprises a damping element made of a spongy material such as rubber or synthetic resin. FIG. 8 illustrates one example of a preferable structure of such damper member in which a coil spring is centrally inserted within a hollow tubular damping element.

Figure 6:
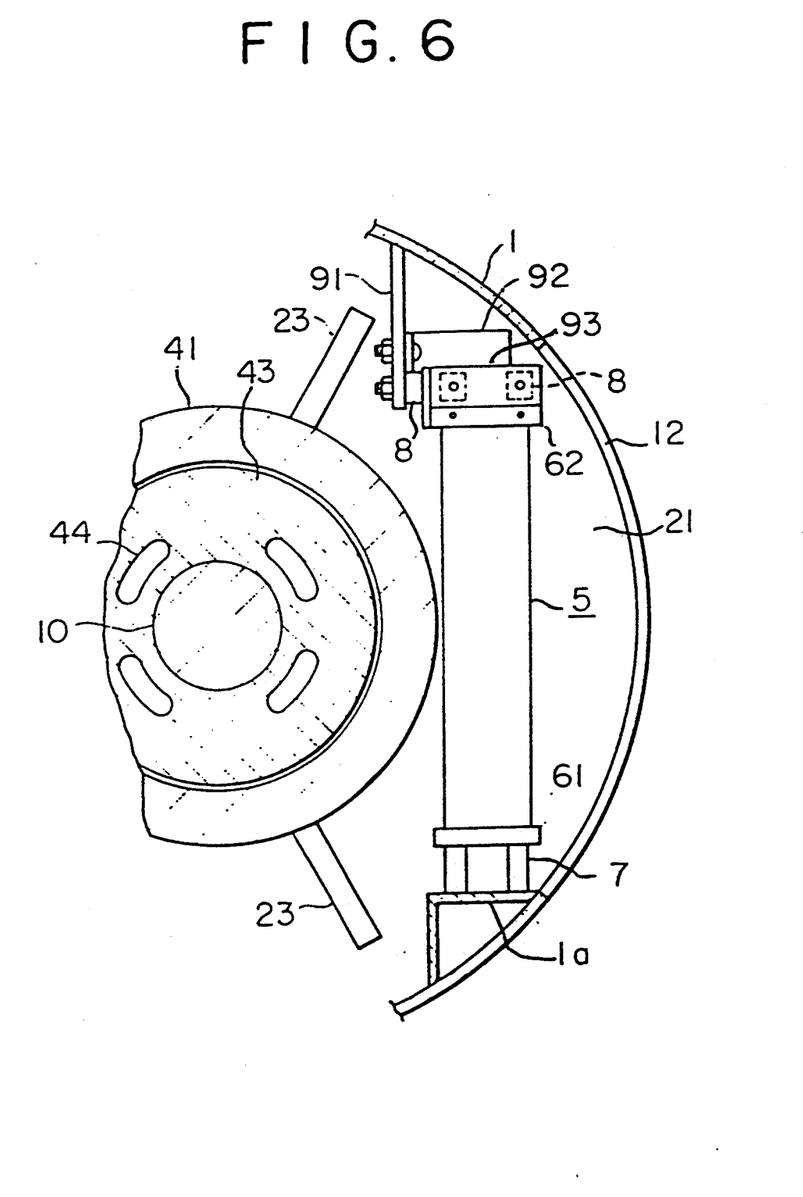
FIG. 6 is a sectional view showing the vibration damping system for the rectifier unit of the present invention.
Figure 7:
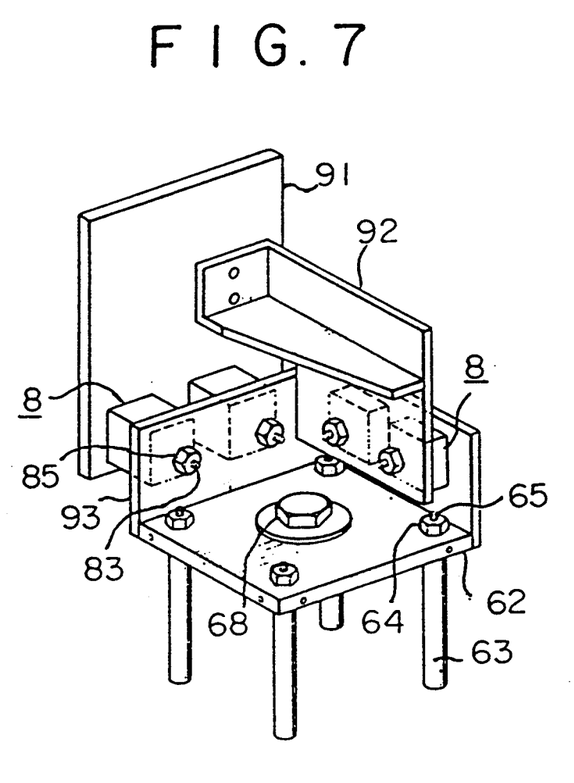
FIG. 7 is a perspective view showing the upper vibration damper arrangement of the rectifier unit.

FIG. 6 shows one embodiment of the vibration damping system for the rectifier unit, in which the bottom of each of the rectifier unit 5 is supported at the lower plate 61 by the first vibration damper member 7 secured to the floor 1a of the generator frame 1 and the upper portion of the rectifier unit 5 is supported at the upper plate 62 by the second vibration damper members 8 as best shown in FIG. 7.

FIG. 7 illustrates an example of the upper vibration damping structure, in which element number 91 is a support frame secured to the generator frame 1, 92 is a support frame secured by screws to the support frame 91, 93 is an L-shaped support plate attached to two sides of the upper plate 62. The second vibration damping members 8 are disposed between the support plate 93 and the support plates 91 and 92.

FIGS. 8 and 9 illustrate one example each of the second and first vibration damping members 8 and 7, respectively. In FIG. 8, element number 81 is a coil spring 81, 82 are caps disposed at the opposite ends of the spring 81, 83 are bolts disposed at the ends of the cap 82, 84 is a hollow cylindrical damping element secured to the caps 82 and made of a spongy rubber or synthetic resin material to exhibit a damping effect with respect to the spring action of the coil spring 81. The bolts 83 extend through the support plates 91, 92 and 93 and is secured by nuts 85.

In FIG. 9, the first vibration damping member 7 comprises parts designated by the reference numerals 71 to 74. Element number 71 is a main body of the damping member 7 which comprises a coil spring 7a having a spring function and a damping element 7b made of a vibration damping rubber having a damping characteristic with respet to the coil spring 7a. Therefore, the damping member main body 71 has an appropriate spring characteristic and damping characteristic 72 are caps attached to the opposite ends of the damping member main body 71 and bone threaded bolts 73 at their ends. One of the bolts 73 is attached to the floor 1a of the generator frame 1 and the other is thread-engaged into the lower plate 61 of the rectifier unit 5. The coil spring 7a is embedded within the tubular vibration damping element 7b. This arrangement effectively damps and absorbs the vibrations of wide range of amplitude and frequency.

Figure 13:
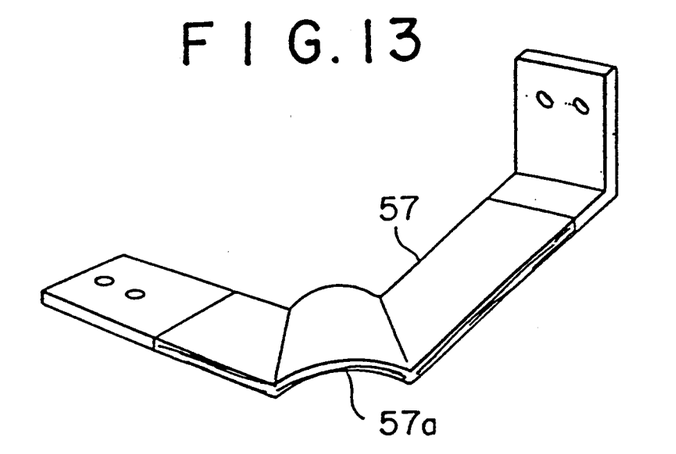
FIG. 13 is a perspective view illustrating one example of the flexible conductor shown in FIG. 10.

FIG. 10 illustrates the electrical connection between the armature winding 32 of the generator and the rectifier unit 5, in which 56 are connecting conductors connected to the phase rings 33 of the armature winding 32, 58 are connecting conductors connected to the terminals 54 of the rectifier unit 5, and 57 are flexible conductors connected between the conductors 56 and 58. Since the manners of vibration of the rectifier unit 5 supported by the vibration damping members 7 and 8 and the armature winding 32 supported by the stator core 31 are different, the connecting conductors between them may be damaged or broken if the conductors are rigid. In order to prevent this from occurring, the conductors 57 connected between the conductors 56 and 58 are flexible conductors each comprising a plurality of laminated thin copper strips and provided with a bent or an arcuate portion 57a at the middle thereof as seen in FIG. 13. 59 is a connecting conductor for connecting the terminal 54 to a lead-out conductor 17.

Each of the flexible conductors 57 is bent edgewise and has an arcuate portion 57a at its central portion as shown in FIG. 10, whereby contraction or expansion or any deformation of the conductor can be accommodated. As a result vibrations ever a wide range of amplitudes and frequencies can be absorbed, whereby the vibrations of the armature winding 32 and the rectifier unit 5 can be decreased.

Figure 14:
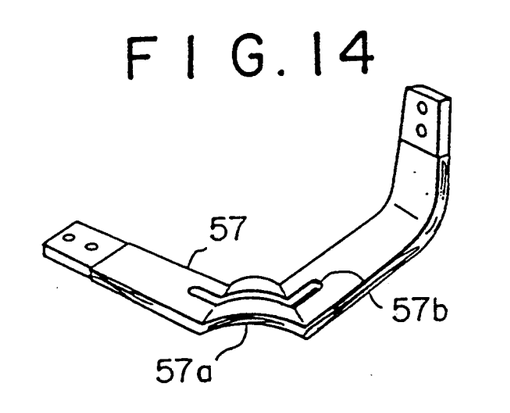
FIG. 14 is a perspective view illustrating another example of the flexible conductor shown in FIG. 10.
Figure 15:
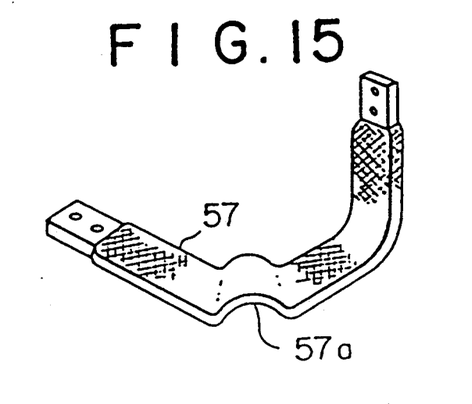
FIG. 15 is a perspective view illustrating another example of the flexible conductor shown in FIG. 10.
Figure 16:
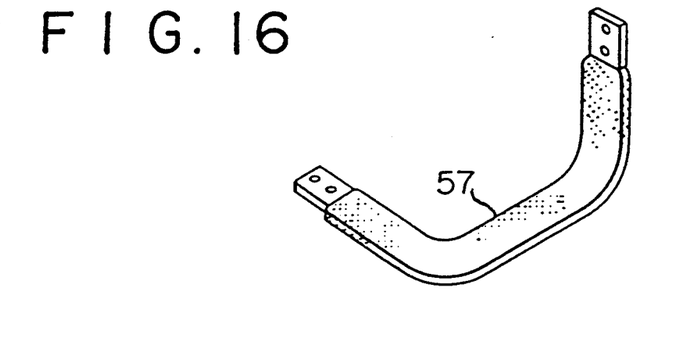
FIG. 16 is a perspective view illustrating still another example of the flexible conductor shown in FIG. 10.
Figure 17:
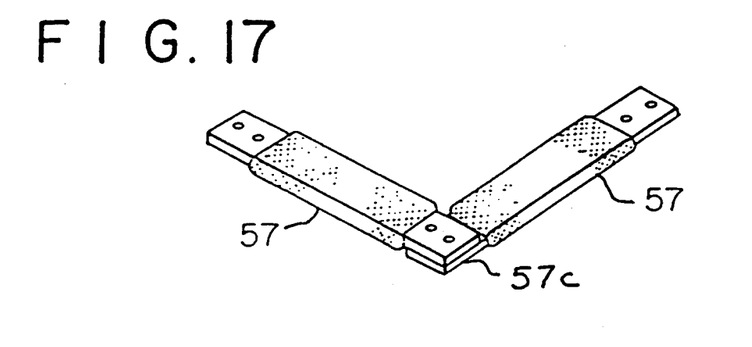
FIG. 17 is a perspective view illustrating a further example of the flexible conductor shown in FIG. 10.

FIGS. 14 to 17 illustrates various modifications of the flexible conductors 57. FIG. 14 shows the flexible conductor 57 having a slit 57b formed in the arcuate portion 57a in order to increase its flexibility. The flexible conductors 57 shown in FIGS. 15, 16 and 17 are braided conductors also referred to as shunt wires with (FIG. 15) or without (FIG. 16) the arcuate portion 57a and a joint 57c (FIG. 17).

Figure 18:
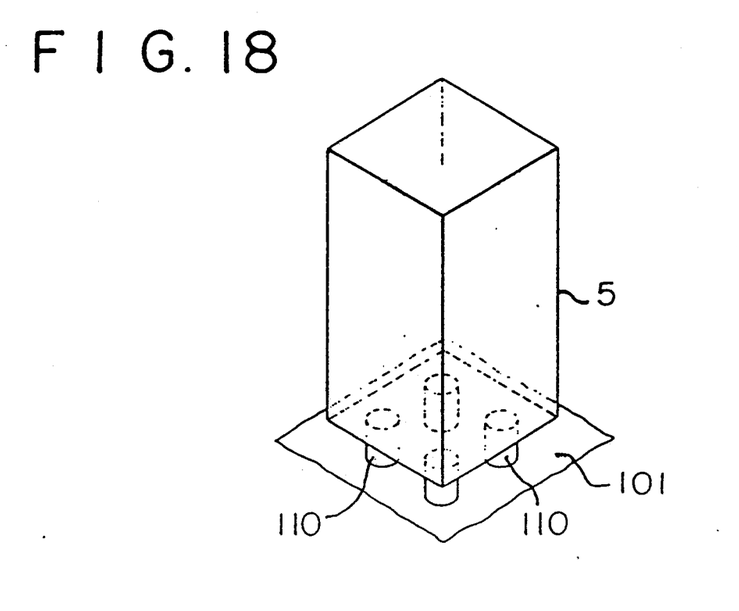
FIG. 18 is a perspective view schematically illustrating a conventional vibration damping system for a rectifier unit of a conventional generator.

The operation of the vehicular generator will now be described. The generator is mounted on a Diesel locomotive and is supported through the generator frame 1 in a contilevered state by the engine frame 201 of the Diesel engine. Therefore not only the vibration generated upon starting of the generator, but also the various vibrations of different amplitudes and frequencies are applied from the Diesel engine upon the acceleration or deceleration of the locomotive, during running, and particularly when crossing points, during braking, etc. While these vibrations have both vertical and horizontal components, the vibration in the vertical direction is mainly accommodated by the lower vibration damper member 7 and the vibration in the horizontal direction is mainly accommodated by the upper vibration damper members 8 arranged at substantially right angles to each other. The upper vibration damper members 8 are arranged in free state in which neither tensile nor compressive force is applied to the coil spring 81 and the damping element 84 in the stationary state, and the coil spring 81 and the damping element 84 are compressed or expanded only when they are subjected to a vibration. Since the vibration damper members 7 and 8 have an appropriate damping characteristic in addition to elasticity, they can absorb various vibrations over a wide range of amplitudes and frequencies as well as vibrations in different directions. Thus, since the upper portion of the rectifier unit is provided with the vibration dampers, the vibrations applied to the rectifier unit can be reduced and the operating lifetime of the rectifier unit can be increased. In contrast, the conventional vibration damper arrangement has the lower damping rubber members 110 and has no upper damper as schematically illustrated in FIG. 18 so, the upper portion of the rectifier unit disadvantageously oscillates or swings.

The ventilation of the generator will now be explained referring to FIGS. 1 and 2. When the fans 13 and 37 are rotated by the engine, cooling air flows into the generator from the air intake 12 on the side remote from the engine as shown by arrows A. The cooling air cools the cooling fins 55 of the rectifier elements 51-53 of the rectifier unit 5. The air then flows along the outer circumference of the stationary core 41 of the exciter and through the air gap and the axial ventilation passage 44 of the rotor and along the outer circumference of the stator core 31 of the generator, the air gap and the inner circumference of the rotor core 34 and is discharged from the engine frame 201 by the main fan 13.

According to this embodiment, the generator unit and the exciter unit are contained within a generator frame supported in a contilevered state, the rectifier units are divided into two and are disposed in a vertical position within a space between the exciter stator core and the generator frame, and vibration damper members having vibration damping characteristics are provided to support the upper and the lower portions of the vertically-extending rectifier units. Therefore, the rectifier units can be installed in a small space within the generator, thereby reducing the size of the generator and the wiring work. Also, since the rectifier units are positioned at the air intake, the maintenance of the rectifier units can be easily done from the outside and the rectifier units can be effectively cooled.

While the rectifier units 5 are divided into positive and the negative side units in the above embodiment, the arrangement of the rectifier units 5 can be changed according to the connection to the armature winding 32 and the maintenance operation. For example, a single rectifier unit may be disposed below the exciter stator core 41. The vibration damper member may be a hydraulic damper. While the rib-shaped support arms 23 projecting from the bracket 21 are used to support the exciter stator core 41 in this embodiment, the ribs projecting from the generator frame 1 may instead be used to support the exciter stator core 41.

Further, instead of directly securing the exciter stator core 41 to the support arms 23, a support ring which surrounds and supports the core may be provided between the support arms and the core. Also, the inverter shown in FIG. 3 may be replaced with a chopper unit for changing the d.c. voltage applied to a d.c. motor serving for the generator as a load.

As has been described, according to the present invention, the rectifier unit for rectifying the output current from the armature winding of a large-capacity a.c. generator to be mounted on a locomotive or the like, in which the mounting space is limited and severe vibrations take place, is supported by a vibration damper system and disposed within a space defined between the inner circumference of the generator frame and the exciter stator core. Therefore, the rectifier unit which is sensitive to vibrations can be installed within the limited space within the generator frame and effectively protected against vibrations, impacts and temperature. Also, since the generator can be shipped with the rectifier unit completely assembled and wired within the generator frame, the assembly and wiring of the generator to the vehicle are significantly simplified. This is particularly advantageous for a vehicular a.c. generator used in an area where the skill of workers who perform the assembly is not always very high.

What is claimed is:

1. A vehicular a.c. generator connectable to a driving engine and mounted on a vehicle, comprising:
    a generator frame having a first end for connection to the driving engine and a second end;
    a stationary core mounted within the frame;
    a generator armature winding wound on the stationary core;
    a rotor core disposed within the stationary core with an air gap therebetween;
    a generator field winding wound on the rotor core;
    a shaft having the rotor core secured thereon and connectable at the outside of the first end of the generator frame to the driving engine;
    a bracket mounted to the second end of the generator frame;
    an exciter rotor core mounted on the shaft on the opposite side of the stationary core from the engine;
    an exciter armature winding wound on the exciter rotor core for supplying an excitation current to the generator field winding;
    an exciter stator core disposed around the exciter rotor core with an air gap therebetween and mounted on the frame or the bracket;
    an exciter field winding wound on the exciter stator core;
    a rectifier unit disposed between an inner circumference of the frame and an outer circumference of the exciter stationary core for rectifying an a.c. current from the generator armature winding; and
    a vibration damper arrangement disposed between the rectifier unit and the frame or the bracket.

2. A vehicular a.c. generator as claimed in claim 1, wherein the frame is directly connectable to the driving engine.

3. A vehicular a.c. generator as claimed in claim 1, further comprising;
    a fan mounted on the shaft between the stationary core and the engine; and
    an air intake window formed in at least one of the frame and the bracket,
    wherein the rectifier unit is substantially vertically mounted between the inner circumference of the frame and the outer circumference of the exciter stator, whereby the rectifier, the exciter, and the generator are cooled by a cooling air flow induced by the fan through the air intake window.

4. A dynamoelectric machine comprising:
a frame;
a stationary core supported by said frame;
an armature winding wound on said stationary core;
a vibration damper member;
a rectifier supported on the frame by the vibration damper member; and
a connecting conductor connected between the armature winding and the rectifier and comprising a flexible strip conductor.

5. A dynamoelectric machine as claimed in claim 4 wherein the connecting conductor comprises first and second substantially flat sections flexibly connected to one another.

6. A dynamoelectric machine as claimed in claim 4 wherein the connecting conductor comprises a substantially flat first section lying in a first plane, a substantially flat second section lying in a second plane, and an arcuate portion connected between the first and second sections.

7. A dynamoelectric machine as claimed in claim 6 wherein the arcuate portion curves out of the first and second planes.

8. A dynamoelectric machine as claimed in claim 7 wherein the arcuate portion has a slot formed therein for increasing the flexibility of the arcuate portion.

9. A dynamoelectric machine as claimed in claim 6 wherein the first section extends at an angle with respect to the second section.

10. A dynamoelectric machine as claimed in claim 5 wherein the first and second sections are substantially coplanar.

11. A dynamoelectric machine as claimed in claim 10 wherein the connecting conductor comprises a third section connected to extending from the second section out of the plane of the second section.

12. A dynamoelectric machine as claimed in claim 4 wherein the connecting conductor comprises a plurality of laminated conducting strips.

13. A dynamoelectric machine as claimed in claim 4 wherein the connecting conductor comprises a braided conductor.

* * * * *